(12) United States Patent
Tanaka et al.

(10) Patent No.: US 8,441,429 B2
(45) Date of Patent: May 14, 2013

(54) CLOCK GENERATION CIRCUIT, LIGHT SOURCE CONTROL CIRCUIT, AND DISPLAY DEVICE

(75) Inventors: Yuji Tanaka, Osaka (JP); Takayuki Murai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 163 days.

(21) Appl. No.: 12/737,624

(22) PCT Filed: Jul. 23, 2009

(86) PCT No.: PCT/JP2009/063150
§ 371 (c)(1),
(2), (4) Date: Jan. 31, 2011

(87) PCT Pub. No.: WO2010/044301
PCT Pub. Date: Apr. 22, 2010

(65) Prior Publication Data
US 2011/0157259 A1    Jun. 30, 2011

(30) Foreign Application Priority Data
Oct. 14, 2008    (JP) .................................. 2008-265620

(51) Int. Cl.
*G09G 3/36* (2006.01)
*G06F 3/038* (2006.01)

(52) U.S. Cl.
USPC ................. 345/102; 345/94; 345/98; 345/99; 327/291; 327/298; 327/299

(58) Field of Classification Search ............ 345/87–104, 345/204–215, 690–699; 327/291–299
See application file for complete search history.

(56) References Cited

U.S. PATENT DOCUMENTS

| 5,844,540 | A | | 12/1998 | Terasaki | |
|---|---|---|---|---|---|
| 6,160,433 | A | * | 12/2000 | Yamazaki | 327/159 |
| 6,320,574 | B1 | * | 11/2001 | Eglit | 345/213 |
| 6,492,983 | B2 | * | 12/2002 | Nishitani et al. | 345/213 |
| 7,106,294 | B2 | * | 9/2006 | Kumamoto et al. | 345/102 |
| 7,472,305 | B1 | * | 12/2008 | Hershman et al. | 713/500 |

(Continued)

FOREIGN PATENT DOCUMENTS

| EP | 1 014 332 | 6/2000 |
|---|---|---|
| JP | 54-79150 U | 6/1979 |

(Continued)

OTHER PUBLICATIONS

International Search Report.

*Primary Examiner* — Amr Awad
*Assistant Examiner* — Roberto Flores
(74) *Attorney, Agent, or Firm* — Harness, Dickey & Pierce, P.L.C.

(57) ABSTRACT

A PLL as a clock generation circuit that generates a PWM clock based on a reference clock, which PWM clock is used for controlling, in a pulse width modulation method, a lamp on time and a lamp off time of a light source illuminating a liquid crystal panel by synchronizing with a video signal that performs display in a set period on the liquid crystal panel, includes a configuration that generates a PWM clock that can maintain a fixed ratio of the lamp on time to the lamp off time within one period even if the set period is changed, by changing a pulse interval of the reference clock in conjunction with the change in the set period.

16 Claims, 9 Drawing Sheets

U.S. PATENT DOCUMENTS

| | | |
|---|---|---|
| 2004/0183822 A1 | 9/2004 | Woo |
| 2005/0212461 A1 | 9/2005 | Onishi |
| 2005/0237429 A1* | 10/2005 | Grundmeyer et al. ........ 348/510 |
| 2006/0001464 A1* | 1/2006 | Yokozeki ..................... 327/156 |
| 2007/0001999 A1 | 1/2007 | Smith et al. |
| 2007/0211014 A1* | 9/2007 | Kim et al. .................... 345/102 |
| 2008/0074381 A1* | 3/2008 | Kumamoto .................. 345/102 |
| 2008/0117157 A1* | 5/2008 | Hwang et al. .................. 345/92 |
| 2008/0129663 A1* | 6/2008 | Honda ............................ 345/84 |
| 2008/0143757 A1* | 6/2008 | Furihata et al. ............... 345/690 |
| 2009/0146942 A1* | 6/2009 | Lee et al. ..................... 345/102 |
| 2009/0206897 A1* | 8/2009 | Kim et al. .................... 327/158 |
| 2010/0020004 A1* | 1/2010 | Smith .......................... 345/102 |
| 2010/0085295 A1* | 4/2010 | Zhao et al. ................... 345/102 |

FOREIGN PATENT DOCUMENTS

| | | |
|---|---|---|
| JP | 2-249306 A | 10/1990 |
| JP | 8-340498 A | 12/1996 |
| JP | 2000-292767 A | 10/2000 |
| JP | 2005-274883 A | 10/2005 |
| JP | 2007-241286 A | 9/2007 |
| JP | 2008-096696 A | 4/2008 |
| JP | 2008-139480 A | 6/2008 |
| JP | 2008-145916 A | 6/2008 |

* cited by examiner

CLOCK GENERATION CIRCUIT, LIGHT SOURCE CONTROL CIRCUIT, AND DISPLAY DEVICE

TECHNICAL FIELD

The present invention relates to a technique of generating a clock by use of a reference clock, which clock is synchronized with a periodical signal made up of periodic pulse trains. Further, the present invention relates to controlling lamp on/off operation of a light source in a display device on which a video image is displayed while modulating an amount of light emitted from the light source based on a video signal.

BACKGROUND ART

One example of a display device that displays a video image while modulating an amount of light emitted from a light source based on a video signal is a liquid crystal display device. In recent years, a display of mobile phones and computers, or a liquid crystal display device applied to televisions, include a liquid crystal display panel and a light source unit. The light source unit is classified into a backlight type or a sidelight type, however in whichever case, the light source unit is capable of uniformly emitting light to the liquid crystal display panel.

A backlighting control technique that periodically turns the backlight on and off is known as a technique to reduce the amount of electricity consumption of such a liquid crystal display device. Patent Literature 1 shown below focuses on a problem in the conventional backlighting control technique, in which flickering occurs caused by interaction of a frequency at a time when updating of data is carried out in a liquid crystal display device with a frequency at which the backlighting is provided. In order to solve this problem, Patent Literature 1 discloses a method and a circuit that generate a pulse width modulating signal for turning the light source on and off so as to synchronize with each frame of display data provided to a liquid crystal display device.

CITATION LIST

Patent Literature

Patent Literature 1
Japanese Patent Application Publication, Tokukai, No. 2007-241286 A (Publication Date: Sep. 20, 2007)
Patent Literature 2
Japanese Patent Application Publication, Tokukaihei, No. 8-340498 A (Publication Date: Dec. 24, 1996)

SUMMARY OF INVENTION

Technical Problem

However, the conventional backlighting control technique and the technique disclosed in Patent Literature 1 give no consideration to a case where a frame period of a video signal changes as a result of a change in a source of the video signal or a change in a destination (distributing region) of a display device. Hence, these techniques completely ignore that an appropriate backlighting control is to be carried out at all times, and that a new clock is required for carrying out this appropriate backlighting control.

Therefore, with the conventional technique, if the frame period of the video signal changes, an amount of light emitted from the light source per time of one frame varies. This causes a problem that brightness of a display screen varies between the frame period which has not been subjected to the change and the frame period which has been subjected to the change.

A mechanism of how this problem occurs is as described below.

First, an example of a case where a source of a video signal changes as described above is a case where a television broadcasting signal serving as a video signal is switched over to a video signal supplied from another video source such as a DVD (digital versatile disk) player. For instance, television broadcasting signals viewed in our country is in conformity to the NTSC system, and its frame frequency is set at 60 Hz. In comparison, video signals supplied from another video source includes ones having a frame frequency of 24 Hz, as like a video signal generated based on a movie shown at a movie theater.

Moreover, an example of a case where a frame period of a video signal changes depending on a destination of a display device includes a case where the frame period changes between countries that use the NTSC system and those that use the PAL system. That is to say, if the system changes from the NTSC system to the PAL system, we cannot avoid the change in the frame frequency from 60 Hz to 50 Hz.

FIG. 9 is a timing chart of various signals showing that an amount of light emitted from a light source per time of one frame changes in a case where a frame period of a video signal varies.

A frame start signal is of a frame pulse train corresponding to frame periods of a video signal. A first and second frame pulse corresponds to for example a frame frequency of 60 Hz, and the second and third frame pulses correspond to for example a frame frequency of 50 Hz. When a frame frequency (frame rate) is changed so that the frame frequency is reduced, a frame period is extended. This can be observed by comparing an interval between rising edges of the first and second frame pulses (frame period) with an interval between rising edges of the second and third frame pulses.

LED data is of data columns that causes LED (light emission diode) to be turned on and off in turn at their set lamp on times, in a case where a plurality (numbers 0 to n) of LEDs are used as the light source.

A PWM (pulse width modulation) clock provides a timing of cutting a pulse width, while pulse width modulation is carried out to the LED lamp on/off signal in accordance with the LED data.

In a regular backlighting control, the time for which each of the LEDs is turned on is set to a fixed time. For easy explanation, the example in FIG. 9 assumes that the lighted time is set as 7 clocks worth of the PWM clock. Moreover, the frame periods of the first and second frame pulses (short period) are detected as being 10 clocks by use of the PWM clock. Hence, an LED lamp on/off signal generated by synchronizing with the frame pulse also has a period of 10 clocks. On the other hand, the frame periods of the second and third frame pulses (long period) are detected as 12 clocks with use of the same PWM clock. Hence, the period of the LED lamp on/off signal is also 12 clocks.

This causes each of the LEDs to be turned on for the lamp on time of 7 clocks, regardless of whether the frame period is short or long. As a result, in a case of the short period, the period that each of the LEDs is turned off is for 3 clocks, and in a case of the long period, the period that each of the LEDs is turned off is for 5 clocks. Therefore, in the case of a long frame period, the time in which each of the LEDs is turned off per frame becomes long. This causes a decrease in light emission rate per time of one frame, and as a result, the display screen becomes dark.

Note that the lamp brightness of the light source is defined as in the following equation:

lamp brightness=maximum brightness of LED×lamp on time/(lamp on time+lamp off time)

As such, in controlling the light source by synchronizing with a frame period of a video signal, if a light source is attempted to be lit with a certain PWM clock, a lamp brightness changes in a case where the frame period changes. This is caused as a result of extending a time in which the lamp is turned off or on, in order to synchronize with the frame period. As from the foregoing equation, the lamp brightness decreases in a case where a time for which the lamp is turned off is extended, and the lamp brightness increases in a case where a time for which the lamp is turned on is extended.

One way to solve such a problem is to have a display device separately hold data of the lamp on time or the lamp off time per source of the video signal or per destination of the display device, and have a setting of the lamp on time or the lamp off time be switched over when a frame period is varied. However, this method requires increasing the amount of memory used, and causes the control program to be more complex. Hence, it is disadvantageous in costs and response speed of the display device. Moreover, the display device may not be capable of dealing with a case where an unknown video signal is received by the display device.

The present invention is accomplished in view of the foregoing problem, and its object is to provide: a clock generation method and a clock generation circuit for generating a clock suitable for lamp on/off operation control that does not vary in amount of light emitted from a light source per time of one frame, even if (a) a source of a video signal is changed, (b) a destination of a display device is changed, or (c) an unknown video signal is inputted into the display device; a lamp on/off operation control method and light source control circuit that uses such a clock; and a display device.

Means to Attain Object

In order to attain the object, a lamp on/off operation control method according to the present invention is a method of controlling, in a pulse width modulation method, lamp on/off times of a light source illuminating a display screen by synchronizing with a video signal that is rewritten per set period, which method includes: changing a pulse interval of a first clock in conjunction with a change in the set period, the first clock determining a pulse width corresponding to a lamp on time or a lamp off time and providing a timing for generating a light source drive signal; and generating a modulation clock maintaining a fixed number of clocks in the first clock per one period of the set period regardless of the change in the set period, the lamp on time and the lamp off time being in a fixed ratio within one period even if the set period is changed.

In the configuration, when a video image based on a video signal is displayed on a display screen, the video image on the display screen is rewritten each set period. One piece of video image is displayed on the display screen by use of one period of a video signal, and the one piece of image is called, for example, a frame.

Turning on and off of a light source that irradiates the display screen is controlled so as to synchronize with the set period in which the image is rewritten. The on/off times in such a case are determined based on a pulse width of a light source driving signal. A timing that determines the pulse width is provided depending on the first clock and the number of clocks of the first clock.

According to the present invention, the pulse interval of the first clock, that is, a time interval from a rising edge of a pulse of the first clock to a rising edge of a subsequent pulse, is changed in conjunction with the change of the set period to rewrite the display screen. Consequently, a modulation clock is generated so as to maintain a fixed number of clocks of the first clock per one period of the set period regardless of the change in the set period, and keep the ratio of the lamp on time and the lamp off time within one period at a fixed ratio even if the set period changes.

That is to say, if the set period to rewrite the display screen is changed to a further longer period, the pulse interval of the first clock is extended in conjunction with the long period so that the number of clocks in the first clock per one period of the set period is not changed. The light source driving signal is given a timing to determine a pulse width of the lamp on time and the lamp off time, by use of the first clock that is extended in period length however is not changed in the number of clocks. As a result, the lamp on time and the lamp off time extend in conjunction with the long period, so that the ratio of the lamp on time to the lamp off time is fixed within one period.

On the other hand, when the set period to rewrite the display screen is changed to a shorter period, the pulse interval of the first clock is shortened in conjunction with the short period. In this case also, the number of clocks of the first clock per one period of the set period do not change; hence, the lamp on time and the lamp off time become short in conjunction with the short period, to maintain the ratio of the lamp on time to the lamp off time within one period to a fixed ratio.

As a result, even if a set period in which the image is rewritten is changed, the light emission rate does not change per period. Hence, an effect is attained that even if (a) a source of a video signal is changed, (b) a destination of the display device is changed, or (c) an unknown video signal is inputted into the display device, brightness of the display does not change.

In order to attain the object, a clock generation method of the present invention is a method of generating a first clock based on a second clock that serves as reference, the first clock being used for controlling, in a pulse width modulation method, a lamp on time and a lamp off time of a light source illuminating a display screen by synchronizing with a video signal that is rewritten per set period, which method includes: generating a dividing clock as the first clock, based on (a) a number of clocks A obtained by detecting the set period by use of the second clock and (b) a total number of clocks B of the first clock preset to a fixed value so that a total time of the lamp on time and the lamp off time corresponding to one period worth of the set period is determined, the dividing clock being obtained by dividing the second clock by A/B.

According to the configuration, a set period in which an image is rewritten is detected by use of a second clock that serves as reference. Hence, the number of clocks A which is a result of this detection changes in a case where the set period changes, in conjunction with the changed set period. On the other hand, a total number of clocks B of the first clock, which determines a total time of the lamp on time and the lamp off time of the light source corresponding to one period, is set to a fixed value in advance. Consequently, this does not change.

As a result, in the case where the set period is changed, the dividing clock divided by A/B is a clock that has a same total number of clocks B included in one period, between the one period that has not been subjected to change and the one period which has been subjected to change.

This means that, for example, in a case where the period in which the display screen is rewritten is changed to a long period, the total number of clocks B included in one period does not change; and as a result, a dividing clock is generated which has a pulse interval extended in conjunction with the long period as compared to that before the period is subjected to change. On the other hand, if the period in which the display screen is rewritten is changed to a shorter period, a dividing clock which has a pulse interval shortened in conjunction with the shorter period as compared to the pulse interval before the period is changed is generated as a result, since the total number of clocks B included in one period does not change.

As a result, in controlling the on and off of the light sources by synchronizing with a set period in which a video image is rewritten, it is possible to generate a clock suitable for light source control so that a time during which the lamp is turned on and a time during which the lamp is turned off maintain a fixed ratio within one period even if the set period changes, in a case where the light sources is to be turned on at a set number of clocks.

In order to attain the object, a clock generation circuit of the present invention is a clock generation circuit generating a first clock based on a second clock serving as reference, the first clock being synchronized with a periodical signal made up of a periodic pulse train, the clock generation circuit including: a detector detecting a period of the periodical signal as a number of clocks A of the second clock; and a divider (i) receiving (a) the number of clocks A outputted from the detector and (b) a total number of clocks B of the first clock which is set as a fixed value corresponding to one period worth of the period of the periodical signal and (ii) outputting, as the first clock, a dividing clock obtained by dividing the second clock by A/B.

According to the configuration, a period of the periodical signal is detected by a second clock that serves as reference. Hence, the number of clocks A that is detected as a result, in the case where the period is changed, changes in connection with the changed period. On the other hand, the total number of clocks B of the first clock corresponding to one period of the period is set as a fixed value in advance. Hence, this does not change.

As a result, in the case where the period is changed, the dividing clock divided by A/B is a clock that has a same total number of clocks B in one period, between one period which has not been subjected to the change and one period which has been subjected to the change. That is to say, the dividing clock of the present invention is a clock that (i) maintains synchronization with a periodical signal by maintaining a same period as the periodical signal even if the period of the periodical signal changes, and (ii) does not change in the number of clocks in one period.

As such, for example, in a case where (a) the periodical signal is a video signal, (b) on/off of the light source is controlled by synchronizing with a set period in which the image is rewritten, and (c) the light source is turned on at a determined number of clocks, it is possible to use the dividing clock as a clock suitable for light source control, to maintain a ratio of the lamp on time to the lamp off time within one period even if the period changes.

In order to attain the object, a clock generation circuit of the present invention is a clock generation circuit generating a first clock based on a second clock that serves as reference, the first clock being used for controlling, in a pulse width modulation method, a lamp on time and a lamp off time of a light source illuminating a display screen by synchronizing with a video signal that is rewritten per set period, the clock generation circuit including: a detector detecting a period of the video signal as a number of clocks A of the second clock; and a divider (i) receiving (a) the number of clocks A outputted from the detector and (b) a total number of clocks B of the first clock determining a total time of the lamp on time and the lamp off time corresponding to one period worth of the set period and (ii) outputting, as the first clock, a dividing clock obtained by dividing the second clock by A/B.

According to the configuration, it is possible to fabricate a clock generation circuit that is suitable for accomplishing the clock generation method already described above.

The divider in the clock generation circuit of the present invention further includes: a compare-select circuit; an output circuit; and an adder adding an output value of the compare-select circuit to the total number of clocks B, the compare-select circuit comparing the number of clocks A with an output value C of the adder, and when the output value C is less than the number of clocks A, the compare-select circuit outputting the output value C, and when the output value C is equal to or more than the number of clocks A, the compare-select circuit outputting a value in which the number of clocks A is subtracted from the output value C, and the output circuit outputting a pulse each time the output value C is of a value equal to or more than the number of clocks A.

According to the configuration, the compare-select circuit outputs an output value C of the adder in a period T1 in which the output value C does not exceed the number of clocks A of the second clock, and outputs a value that subtracts the number of clocks A from the output value C in a period T2 in which the output value C equals to or exceeds the number of clocks A. Here, in a case where the period T1 is included m times and the period T2 is included n times in a period, the output value of the compare-select circuit increases by B×(m+n) while decreasing by A×n, thereby resulting that the output value of the compare-select circuit returns to its original value as a result. On this account, averaging this increase and decrease results as an equation of B×(m+n)=A×n. This attains the equation (m+n)/n=A/B. Hence, it is clear that the second clock is divided by A/B.

The compare-select circuit in the clock generation circuit of the present invention further includes: a comparator comparing the number of clocks A with the output value C of the adder; a subtracter subtracting the number of clocks A from the output value C of the adder; and a selector by which an output of the comparator, an output of the adder, and an output of the subtracter are received, and when the output of the comparator shows that the output value C is less than the number of clocks A, the selector selecting the output value C of the adder, whereas when the output of the comparator shows that the output value C is not less than the number of clocks A, the selector selecting and outputting the output of the subtracter.

According to the configuration, it is possible to achieve, with a simple configuration, a clock generation circuit that generates a dividing clock which divides the second clock by A/B.

It is preferable that the compare-select circuit of the clock generation circuit of the present invention further includes a first latch circuit latching the output of the selector by use of the second clock and outputting this latched output of the selector to the adder, in terms of generating a dividing clock that divides the second clock by A/B.

It is preferable that the output circuit provided in the clock generation circuit of the present invention is a second latch circuit latching an output of the comparator by use of the second clock, in terms of generating a dividing clock that divides the second clock by A/B.

The clock generation circuit of the present invention is a digital circuit.

A circuit that has a similar function is an analog circuit called PLL (Phase Lock Loop), however this circuit only gradually follows with respect to the change in input. Hence, when the period changes, the brightness of the light source suddenly changes and thereafter gradually returns back.

On the other hand, a digital circuit is capable of rapid operation as compared to the analog circuit; when the period is changed, the dividing clock can be generated within one period. Hence, it is possible to hold down the change in brightness of the display screen to the least possible, which change in brightness is caused due to change in a light emission amount of the light source. This avoids an observer of the display screen from recognizing the change in the brightness.

The detector in the clock generation circuit of the present invention further includes a period limiting circuit providing a preset maximum value and minimum value of the period.

In the configuration, it is not assumed with a video signal inputted into the display device of a period that exceeds the maximum value or a period that is lower than the minimum value; these periods are thus treated as abnormal periods. Therefore, by providing a period limiting circuit to the detector, it is possible to prevent occurrence of various malfunctions.

Various malfunctions denote, for example, a case where a dividing clock is generated based on an abnormal period, which causes an on time of the light source to be inappropriately long. As a result, this causes the blinking of the light source to be slow to a visible extent, or causes the driving circuit of the light source to operate abnormally.

In order to obtain the object, a light source control circuit of the present invention includes: the clock generation circuit; a light source control data generation circuit receiving the video signal and supplying to the clock generation circuit a sync signal being indicative of the period, and further generating a lamp on/off control signal that determines a time for which the light source is turned on; and a light source drive circuit, while controlling on and off of the light source so that the on and off of the light source synchronizes with the sync signal, (i) counting the time for which the light source is turned on, by use of the dividing clock inputted from the clock generation circuit, the time being indicated by the lamp on/off control signal inputted from the light source control data generation circuit, and (ii) generating a light source driving signal.

According to the configuration, the detector provided in the clock generation circuit is able to calculate the number of clocks A by use of the sync signal provided from the light source control data generation circuit and the second clock. As a result, as already described, the clock generation circuit is capable of generating the dividing clock that A/B divides the second clock, and outputs the dividing clock to the light source drive circuit.

Moreover, the light source control data generation circuit generates a lighting control signal that determines a lighting time of the light source, and outputs this to the light source drive circuit. The light source drive circuit that obtains the dividing clock and the lighting control signal as such counts a lighting time that is shown by the lighting control signal by use of the dividing clock, and generates a light source driving signal that is synchronized with the video signal.

Even if a set period in which an image is rewritten is changed, the light source driving signal is generated by use of a dividing clock that is suitable for performing light source control of maintaining a ratio of a lamp on time to a lamp off time within one period. Hence, even if (a) the source of the video signal is changed, (b) the destination of the display device is changed, or (c) an unknown video signal is inputted into the display device, it is possible to hold down the change in display brightness.

The lamp on time and the lamp off time can be controlled as being always fixed while the period of the video signal is fixed. However, the lamp on time and the lamp off time can be dynamically changed as necessary. In either case, the present invention is applicable.

Examples of dynamically changing the lamp on time and the lamp off time as necessary include the following modes: (1) a mode in which an average brightness of a video signal is calculated, and the lamp on time and the lamp off time of the backlight are changed in accordance with the average brightness; (2) a mode in which a display screen is divided into a plurality of areas, and the lamp on time and the lamp off time of light sources provided in respective areas are changed by a distribution with respect to the areas of brightness calculated from the video signal, and (3) a mode in which the lamp on time and the lamp off time of a backlight is changed based on brightness of the room.

In order to attain the object, a display device of the present invention includes: the light source control circuit; a light source being controlled in its lamp on/off state by the light source control circuit; and a display panel displaying a video image while modulating an amount of light emitted from the light source based on the video signal.

As such, as already described, even if (a) the source of the video signal is changed, (b) the destination of the display device is changed, or (c) an unknown video signal is inputted into the display device, it is possible to provide a display device that can hold down a change in display brightness.

A combination of a configuration recited in a certain claim and another configuration recited in another claim is not limited to a combination of the configuration recited in the certain claim and a configuration from which the certain claim depends from; as long as the object of the present invention is achievable, any combination of the configuration recited in the certain claim and other claims from which the certain claim does not depend is possible.

Advantageous Effects of Invention

As described above, the lamp on/off operation control method according to the present invention, is a method which changes a pulse interval of a first clock in conjunction with a change in a period of a video signal, the first clock determining a pulse width corresponding to a lamp on time or a lamp off time and providing a timing for generating a light source drive signal; and generates a modulation clock maintaining a fixed number of clocks in the first clock per one period of the set period regardless of the change in the set period, which lamp on time and the lamp off time is in a fixed ratio within one period even if the set period is changed.

Hence, even if a set period in which the video image is rewritten is changed, a light emission rate per period does not change. As a result, it is possible to attain an effect that even if (a) a source of the video signal is changed, (b) a destination of the display device is changed, or (c) an unknown video signal is inputted into the display device, no change occurs to the display brightness.

As described above, the clock generation method of the present invention is a method of generating a dividing clock as the first clock, based on (a) a number of clocks A obtained by detecting the set period by use of the second clock that serves as reference and (b) a total number of clocks B of the first clock preset to a fixed value so that a total time of the lamp on time and the lamp off time corresponding to one period worth of the set period is determined, the dividing clock being obtained by dividing the second clock by A/B.

Hence, it is possible to attain an effect that a clock is generated which is suitable for light source control that keeps a ratio of the lamp on time to the lamp off time fixed during one period even if the set period changes, when a light source is turned on during a set number of clocks in controlling on and off of the light source by synchronizing with a set period in which the video image is rewritten.

As described above, the clock generation circuit of the present invention includes a detector detecting a period of a periodical signal as a number of clocks A of a second clock serving as a reference; and a divider (i) receiving (a) the number of clocks A outputted from the detector and (b) the total number of clocks B of the first clock which is set as a fixed value corresponding to one period worth of the period of the periodical signal and (ii) outputting, as the first clock, a dividing clock obtained by dividing the second clock by A/B.

Hence, even if a period of the periodical signal changes, it is possible to generate a dividing clock that can keep a synchronized state with the periodical signal by having a same period as the periodical signal, and further not causing change in the number of clocks in one period.

DESCRIPTION OF EMBODIMENTS

Embodiment 1

Figure 1:
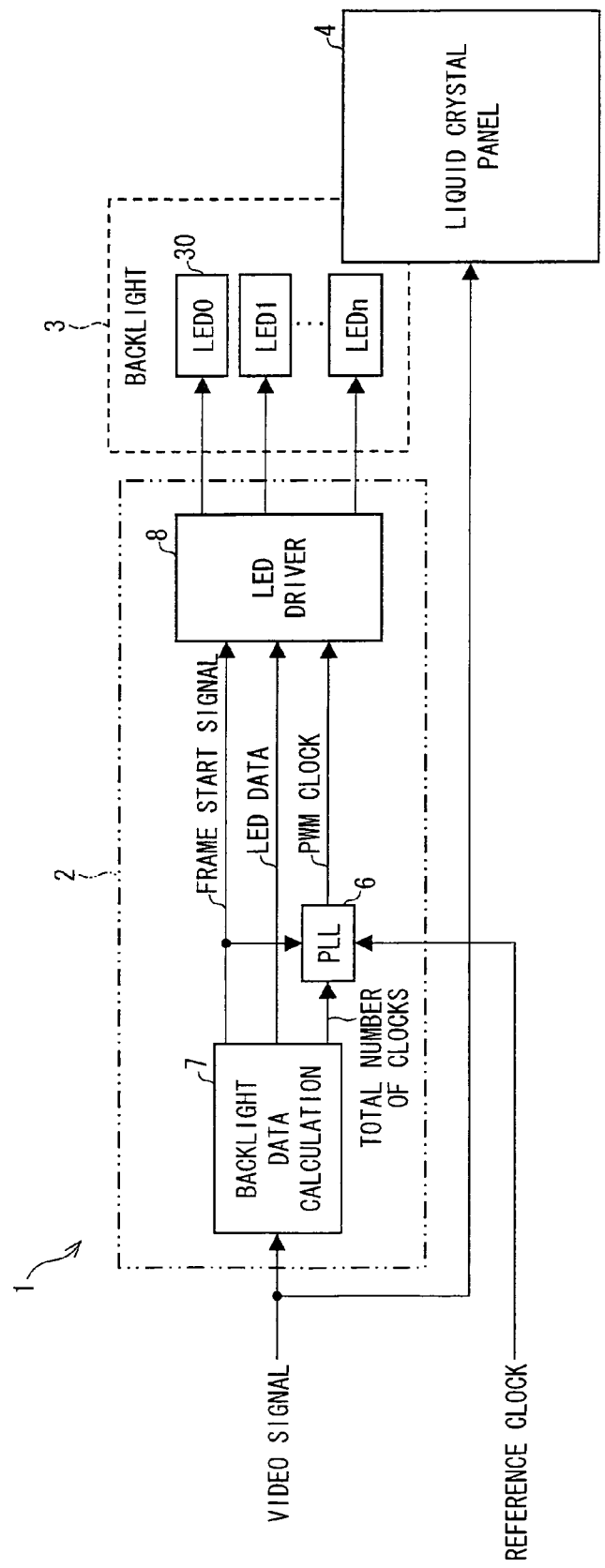
FIG. 1 is a block diagram schematically illustrating an example of a configuration of a display device of the present invention.

One embodiment of the present invention is described below, with reference to FIGS. 1 to 7. For convenience, each of the drawings referred to in the following description illustrates just main parts that are required in describing the present invention, from among the configuration of the one embodiment of the present invention. Consequently, any configurations that are not illustrated in the drawings referred to in the present description may be included in the configuration.

(Main Configuration of Display Device)

FIG. 1 illustrates a configuration of a display device 1 which is one embodiment of a display device of the present invention. The display device 1 includes: a light source control circuit 2; a backlight 3 that is controlled by the light source control circuit 2 in turning its lamp on and off, and a liquid crystal panel 4 (display panel) that displays a video image while modulating an amount of light emitted by the backlight 3 based on a video signal.

The backlight 3 has a plurality of light sources 30 provided on a rear side of the liquid crystal panel 4, where a side on which a display screen is provided in the liquid crystal panel 4 serves as a front side. This configuration allows the backlight 3 to uniformly emit light to the entire display screen from the rear side of the display screen. However, if the size of the display screen is small as like with a mobile phone, this backlight type may be replaced with a sidelight type in which the light sources 30 are disposed on one edge section on the rear side of the display screen to uniformly guide light to the entire display screen.

The plurality of light sources 30 are an LED group of, for example, n+1 LEDs (LED 0 to LED n), as illustrated in FIG. 1. However, the light sources 30 are not limited to the LEDs as long as the light sources are capable of synchronizing with a video signal to control blinking of the light sources.

The light source control circuit 2 includes: a PLL (phase-locked loop) 6, described later in detail, as a clock generation circuit of the present invention; a backlight data calculation circuit 7 (light source control data generation circuit); and a LED driver 8 (light source drive circuit).

The backlight data calculation circuit 7 receives the video signal, supplies to the PLL 6 a frame start signal (sync signal) that indicates a frame period of the video signal, and generates LED data (lamp on/off control signal) that sets the lamp on time of the light sources 30. Moreover, the LED driver 8, when controlling the on and off of the light sources 30 so that the light sources 30 synchronize with the sync signal, counts the lamp on time that is indicated by the LED data thus received from the backlight data calculation circuit 7, by use of PWM clocks (first clock, dividing clock or modulation clock) received from the PLL 6, to generate a light source driving signal.

In a case where a video image based on a video signal is to be displayed on the display screen in the configuration, a video image of the display screen is to be rewritten per set period (frame period). A video signal for one period causes display of one piece of video image on the display screen, and this one piece of video image is called, for example, a frame. Illustrated in (a) of FIG. 2 is a frame start signal that provides, per period, a start timing of a frame period.

The light sources 30 that irradiate the display screen are turned on and off by being controlled based on synchronization with the frame period. The time for which the light sources 30 are turned on or off in such a manner is determined in accordance with a pulse width of the light source driving signal. Illustrated in (d) of FIG. 2 is a light source driving signal supplied from the LED driver 8 to LED 0 from among the LED group (LED 0 to LED n). LED 0 is where the on and off of the lamp first starts at.

Figure 2:
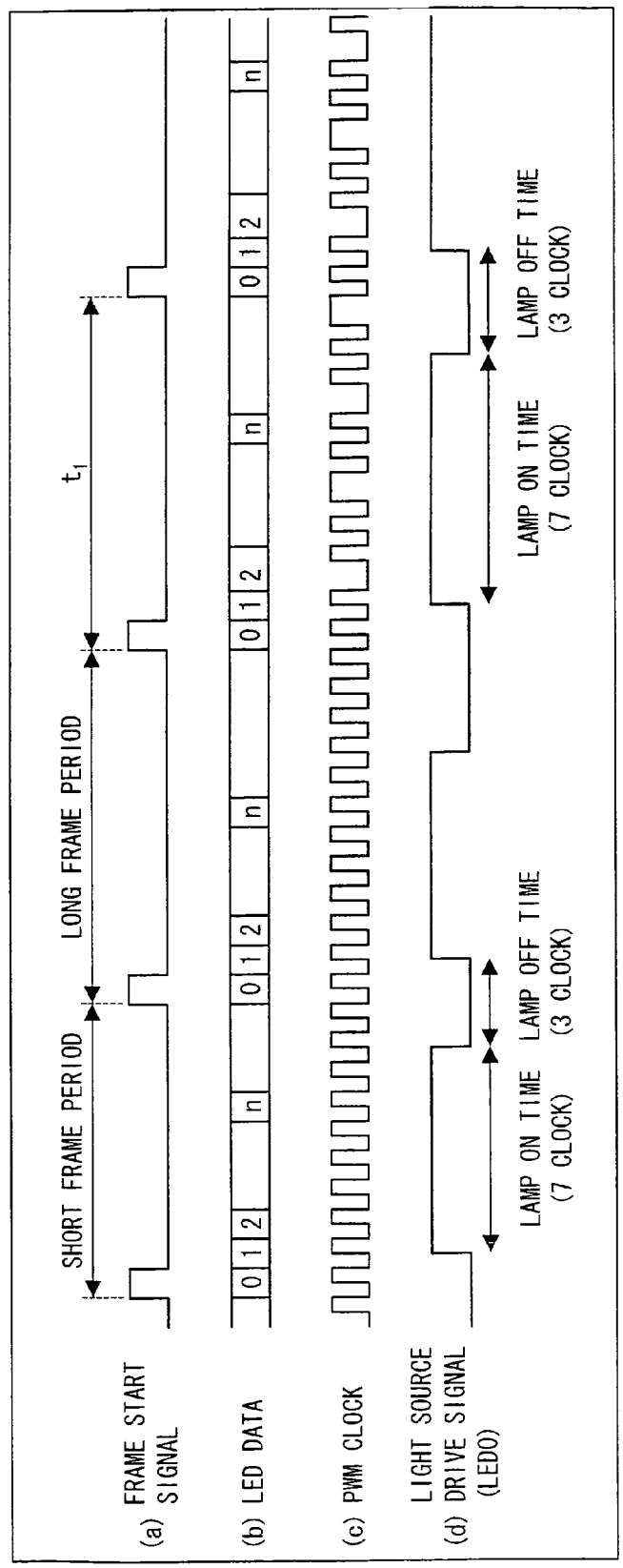
FIG. 2 is a timing chart showing a timing of various signals that are used in a lamp on/off operation control method of the present invention.

As illustrated in (a), (c), and (d) of FIG. 2, the light source driving signal is outputted from the LED driver 8 by synchronizing with the PWM clock that rises after a fall of the frame start signal. The pulse width of the light source driving signal is determined by the LED data generated by the backlight data calculation circuit 7.

The LED data is successively outputted from the backlight data calculation circuit 7 to the LED driver 8 so as to correspond to a respective LED group (LED 0 to LED n), as illustrated in (b) of FIG. 2. In the example illustrated in FIG. 2, the lamp on time of the LED 0 is set by the LED data as 7-clocks worth of the PWM clock, for easy description.

For easy description, the frame period is of a length of 10-clocks worth of the PWM clock; hence, the lamp off time of the LED 0 is 3-clocks worth of the PWM clock. Therefore, a ratio of the lamp on time of the LED 0 to the lamp off time of the LED 0 in one frame period is 7/3.

Figure 7:
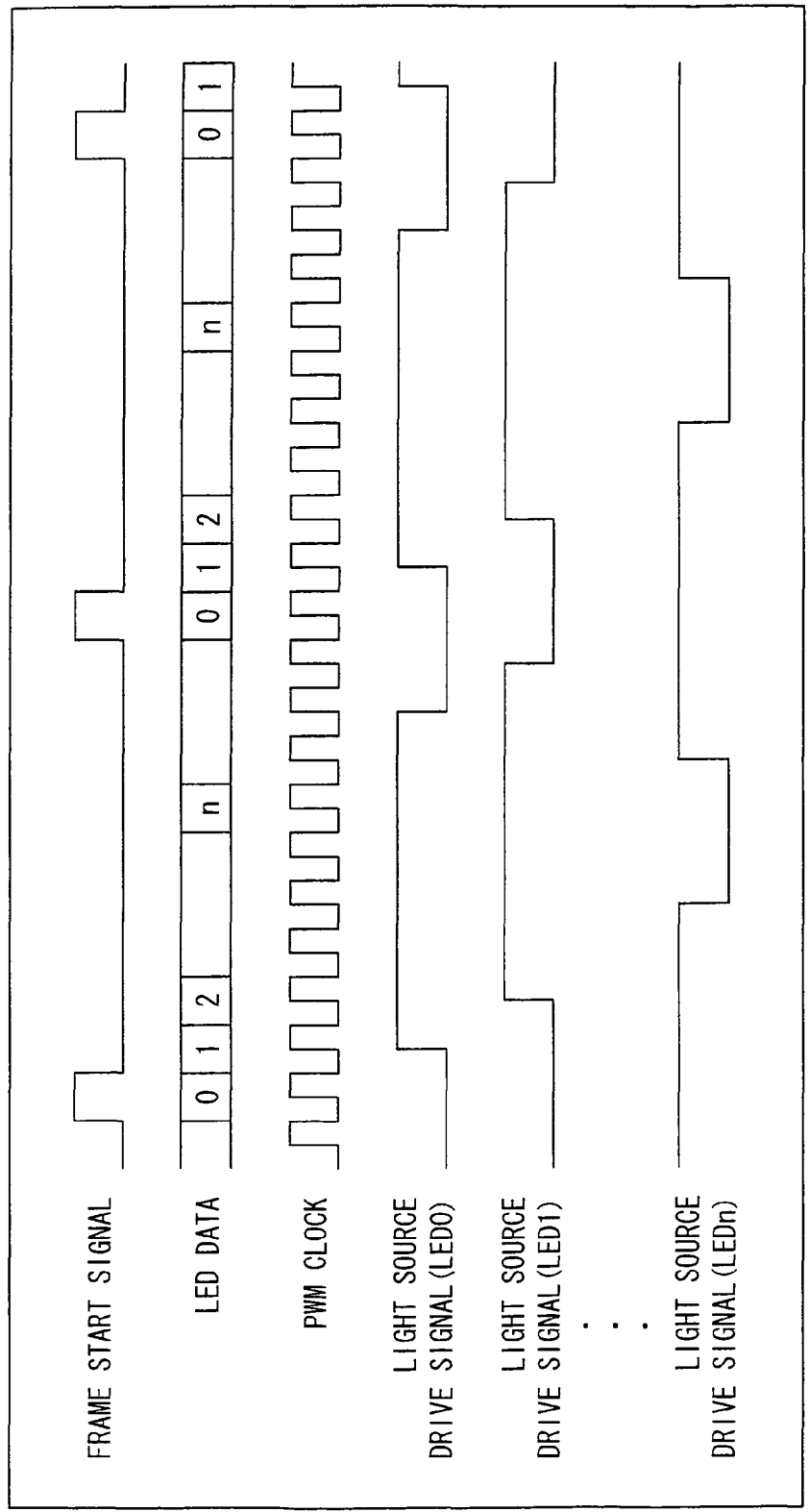
FIG. 7 is a timing chart illustrating a light source driving signal that controls the on and off of a plurality of light sources illustrated in FIG. 1.

FIG. 7 illustrates light source driving signals that are supplied from the LED driver 8 to the respective LED 0 to LED n, successively. FIG. 7 illustrates an example in which a frame period is fixed (10-clocks), and the lamp on time of each of the LED is also set as a same period (7-clocks).

As such, the light sources 30 that irradiate the display screen are turned on and off by being controlled based on synchronization with the frame period in which a video image is rewritten. The lamp on time and the lamp off time of the light sources 30 in that period are determined in accordance with a pulse width of the light source driving signal. Further, the timing at which the pulse width is determined is provided based on the PWM clock and its number of clocks.

Here, assume that a video signal inputted to the display device 1 is switched over, and a frame period changes, as illustrated in (a) of FIG. 2, to be longer than that which has not been subjected to the switchover of the video signal.

In this case, the lamp on/off operation control method according to the present invention changes a pulse interval of the PWM clock, that is, a time interval from a rise edge of a pulse to a rise edge of a subsequent pulse of the PWM clock, in conjunction with a change in the frame period, and generates a modulation clock which maintains a number of clocks of the PWM clock in one frame period at a fixed value, regardless of the change in the frame period, while maintaining a ratio between a lamp on time and a lamp off time, within one frame period even if the frame period is changed.

It is observable from the PWM clock illustrated in (c) of FIG. 2 that the pulse interval thereof is changed to have a reduced frequency while no change is made in the number of clocks included in one frame period from a period $t_1$ (see (a) of FIG. 2) subsequent to the period in which the frame period is changed.

That is to say, in a case where the period for rewriting the display screen is changed to a longer period, the pulse interval of the PWM clock is extended in conjunction with the longer period. The number of clocks in one frame period of the PWM clock is not changed, which PWM clock provides a timing of setting the pulse width of the light source driving signal; so the lamp on time is maintained for example as 7-clocks worth, and the lamp off time is maintained as 3-clocks worth. Namely, the PWM clock is extended in conjunction with the long period as a result, in order to maintain a fixed ratio of the lamp on time to the lamp off time in one frame period.

In a case where the period in which the display screen is rewritten is changed to a shorter period, the pulse interval of the PWM clock is shortened in conjunction with the short period. In this case also, no change occurs to the number of clocks in the one frame period of the PWM clock that provides a timing for determining the pulse width of the light source driving signal; the lamp on time and the lamp off time are shortened in conjunction with the short period so that the lamp on time and the lamp off time within one frame period maintains a fixed ratio.

As such, according to the lamp on/off operation control method of the present invention, an effect is attained that no change occurs to a light emission rate per period even if a set period in which the video image is rewritten is changed. Hence, it is possible to attain an effect that brightness of display does not change even if (a) a source of a video signal is changed, (b) a destination of the display device is changed, or (c) an unknown video signal is inputted into the display device.

(Configuration of Clock Generation Circuit)

The following description deals with the PLL 6 (clock generation circuit) that generates a PWM clock suitable for carrying out the lamp on/off operation control method of the present invention.

Figure 3:
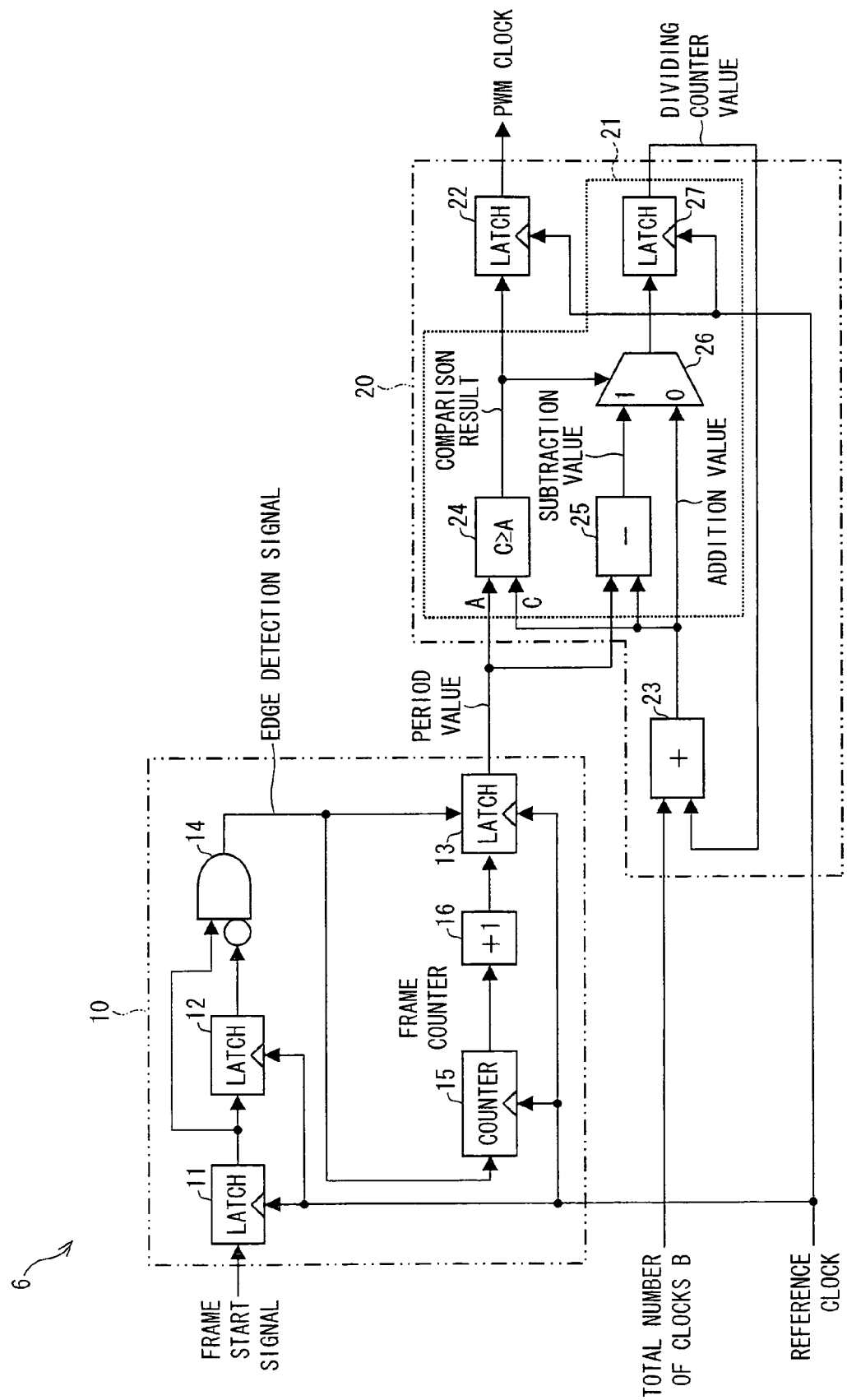
FIG. 3 is a block diagram illustrating an example of a configuration of a clock generation circuit of the present invention.

The PLL 6 generates the PWM clock based on a reference clock (second clock) that has a frequency greater than that of the PWM clock. In order to allow this generation of the PWM clock, the main parts of the PLL 6 include a detector 10 and a divider 20, as illustrated in FIG. 3. The detector 10 detects a frame period of the video signal (period of periodical signal) as the number of clocks A of the reference clock. Moreover, the divider 20 (i) receives (a) the number of clocks A outputted from the detector 10 and (b) a total number of clocks B (a total number of clocks B set to a fixed value in accordance with one period worth of the set period) that determines a total amount of the lamp on time and the lamp off time per one period of the frame period, (ii) generates the PWM clock as a divided clock in which the reference clock is divided by A/B (A/B division), and (iii) outputs this PWM clock.

The total number of clocks B is a fixed value determined from (i) a PWM period of an LED driver (period in which the light source 30 is blinked once; e.g., 10 clocks in the example of (d) of FIG. 2) and (ii) the number of times the backlight is blinked. Therefore, the total number of clocks B is stored as a fixed value calculated in advance. For example, in a case where the PWM period of the LED driver is 4096 clocks and the light sources 30 are blinked two times in one period of the video signal, B is 4096×2=8192. Namely, the total number of clocks B is calculated as a value obtained by multiplying the number of clocks corresponding to the PWM period with the number of blinked times.

Even if it were a mode that dynamically changes the lamp on time and the lamp off time as necessary, the total number of clocks B would still be a fixed value. However, the present invention is not restricted in any manner as to whether or not the total number of clocks B is to be a fixed value.

For convenience, examples in FIG. 1 and FIG. 3 each are illustrated so that the total number of clocks B are calculated by a backlight data calculation circuit 7 and is supplied to the divider 20 of the PLL 6. Detailed configurations and operations of the detector 10 and divider 20 are described later; just an overview of their operations is described here.

Figure 4:
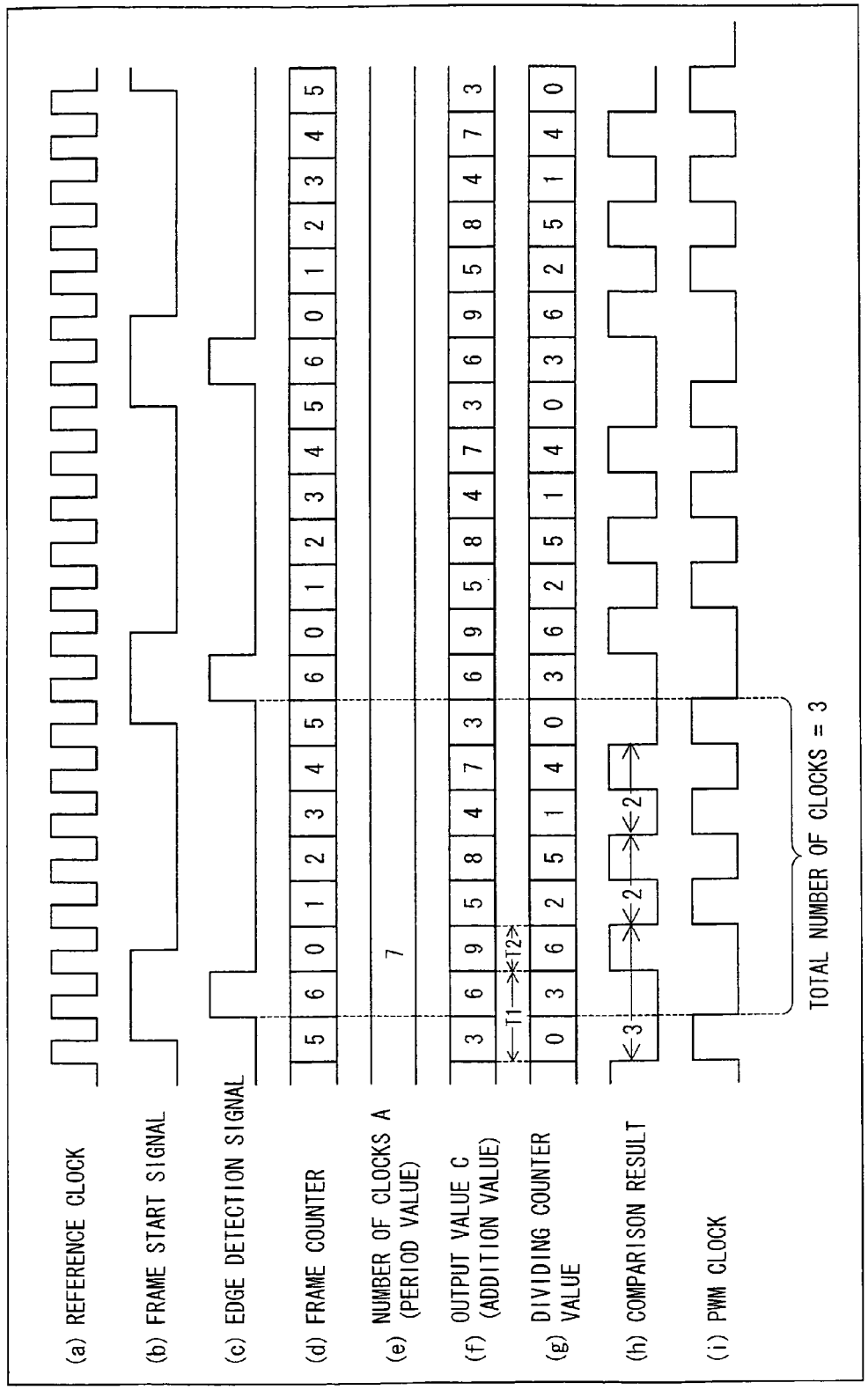
FIG. 4 is a timing chart illustrating examples of timings of various signals related to generation of a PWM clock in the clock generation circuit illustrated in FIG. 3.

FIG. 4 illustrates a timing chart of various signals that are related to the PLL 6. The detector 10 detects the number of clocks of the reference clock included in a frame period, by use of (i) the frame start signal ((b) of FIG. 4) supplied from the backlight data calculation circuit 7 and (ii) the reference clock ((a) of FIG. 4). This number of clocks is the number of clocks A as a period value, and in the example of FIG. 4, the number of clocks is calculated as a period value 7 in (e) of FIG. 4.

According to the configuration, the detector 10 detects frame period of a video signal based on the reference clock. Hence, in a case where the frame period changes, the number of clocks A (period value of 7) which is a result of the detection changes in conjunction with the changed frame period. On the other hand, the total number of clocks B that determine the lamp on time and the lamp off time of the light source 30 per one frame period is fixed, so therefore does not change. For example, in (i) of FIG. 4, the total number of clocks B is set as 3 for easy description.

As a result, in a case where the frame period is changed, the number of clocks included in one frame period of the dividing clock divided by A/B equals to a total number of clocks B both in the one frame period which has not been subjected to change and in the one frame period which has been subjected to the change. This denotes that, for example, in a case where a set period for rewriting the display screen is changed to a long period, the total number of clocks B included in the one period does not change, thereby resulting with a dividing clock that has its pulse interval extended in conjunction with the long period, being generated. Meanwhile, even if the set period for rewriting the display screen is changed to a shorter period, no change occurs to the total number of clocks B included in the one period. Consequently, a dividing clock that has a shortened pulse interval in conjunction with the short period is generated.

As a result, in controlling the on and off of the light sources 30 by synchronizing with a set period in which a video image is rewritten, it is possible to generate a clock suitable for light source control so that a time during which the lamp is turned on and a time during which the lamp is turned off maintains a fixed ratio within one period even if the set period changes, in a case where the light sources 30 is to be turned on at a set number of clocks.

(Configuration and Operation of Detector)

Described below further specifically describes the configuration and operation of the detector 10. As illustrated in FIG. 3, the detector 10 includes: latch circuits 11, 12, 13; an AND circuit 14 in which one of two inputs is of an inverse input; a counter 15; and an increment circuit 16.

The latch circuit 11 latches a frame start signal supplied from the backlight data calculation circuit 7 by use of the reference clock. The latch circuit 12 latches an output of the latch circuit 11 by use of the reference clock. The output of the latch circuit 11 is further inputted into the AND circuit 14 as it is, whereas an output of the latch circuit 12 is inversely inputted into the AND circuit 14.

Subsequently, the output of the AND circuit 14 is inputted into the counter 15 as an edge detection signal that has completed detection of edges of pulse trains of the frame start signal, and is also inputted into the latch circuit 13. The edge detection signal inputted into the latch circuit 13 provides an output timing of the latch circuit 13. Moreover, the output of the counter 15 is latched by the latch circuit 13 via the increment circuit 16. The counter 15 counts a length of the frame period as the number of clocks of the reference clock. Therefore, the counter 15 may also be called a frame counter.

In the configuration, once the frame start signal shown in (b) of FIG. 4 is latched by the latch circuit 11 at a timing of the reference clock shown in (a) of FIG. 4, the latch circuit 12 performs an output with a delay of one clock worth of the reference clock from the output of the latch circuit 11. Therefore, after the frame start signal is raised, a non-inverse input of the AND circuit 14 becomes a high level and an inverse input becomes a low level just when the reference clock initially rises. At this time, the output of the AND circuit 14 is in a high level.

Subsequently, when the reference clock rises for the second time after the frame start signal rises, both the non-inverse input and inverse input of the AND circuit 14 becomes high in level; hence, the output of the AND circuit 14 falls to a low level. Needless to say, when the frame start signal falls, the output of the AND circuit 14 becomes low in level.

As such, as illustrated in (c) of FIG. 4, the edge detection signal that is high in level just for one clock worth of the reference clock synchronizes with the frame start signal and is outputted from the AND circuit 14.

The counter 15 outputs a count value each time the reference clock is inputted. When the edge detection signal is inputted, the counter 15 resets the count value to 0. The increment circuit 16 causes the latch circuit 13 to latch a value that adds 1 to the count value, every time the reference clock is inputted.

The latch circuit 13 outputs a value that is latched when the edge detection signal becomes high in level. As illustrated in (d) of FIG. 4, the counter 15 outputs 6 as a value prior to resetting at a time when the edge detecting signal is in a high level; hence, the latch circuit 13 latches 7.

As such, the detector 10 detects a frame period of the video signal by use of the number of clocks of the reference clock, and outputs from the latch circuit 13 a period value 7 as the number of clocks A, at the time when the edge detecting signal becomes high in level.

(Configuration of Divider)

The divider 20 includes: a compare-select circuit 21; a latch circuit 22 (second latch circuit) as an output circuit; and an adder 23 that adds an output value of the compare-select circuit 21 to the total number of clocks B.

The compare-select circuit 21 compares the number of clocks A with the output value C of the adder 23; if the output value C is a value less than the number of clocks A, the compare-select circuit 21 outputs the output value C, and if the output value C is of a value not less than the number of clocks A, then the compare-select circuit 21 outputs a value calculated by subtracting the number of clocks A from the output value C.

More specifically, the compare-select circuit 21 includes: a comparator 24 that compares the number of clocks A with the output value C of the adder 23; a subtracter 25 that subtracts the number of clocks A from the output value C of the adder 23; and a selector (multiplexer) 26 that receives output of the comparator 24, the adder 23, and the subtracter 25, and selects the output value C of the adder 23 in a case where the output of the comparator 24 indicates that the output value C is less than the number of clocks A and selects the output of the subtracter 25 in a case where the output of the comparator 24 indicates that the output value C is not less than the number of clocks A. The output of the selector 26 is fed back to the adder 23 via a latch circuit 27 (first latch circuit).

The latch circuit 22 outputs a pulse each time the output value C is a value not less than the number of clocks A. Consequently, the output of the latch circuit 22 serves as the PWM clock that is generated by dividing the reference clock by A/B.

(Operation Example 1 of Divider)

According to the configuration, first, the comparator 24 compares the number of clocks A received from the detector 10 with the output value C of the adder 23, and a comparison result is outputted to the latch circuit 22 and the selector 26.

For example, at a timing at which the edge detection signal illustrated in (c) of FIG. 4 rises, the output value C of the adder 23 is 6 as illustrated in (f) of FIG. 4. Hence, the comparator 24 compares the output value C being 6 with the number of clocks A being 7. The comparison attains a result that the output value C does not exceed the number of clocks A, so the comparator 24 outputs, as illustrated in (h) of FIG. 4, 0 as a comparison result to the latch circuit 22 and the selector 26.

Moreover, after one clock worth of the reference clock of the edge detection signal is elapsed from the timing at which the edge detection signal rises, the output value C of the adder 23 becomes 9. Hence, the comparator 24 compares the output value C being 9 with the number of clocks A being 7. Since the output value C exceeds the number of clocks A, the comparator 24 outputs 1 as a result of comparison, to the latch circuit 22 and the selector 26.

In response to the comparison result, the selector 26 outputs the output value C (e.g., 3 or 6) as it is in a time T1 (see (f) of FIG. 4) in which the output value C of the adder 23 does not exceed the number of clocks A of the second clock, and in a time T2 in which the output value C exceeds the number of clocks A, the selector 26 outputs a value calculated by subtracting the number of clocks A from the output value C with the subtracter 25. For example, when the output value C is 9, the selector 26 outputs 2, which is a difference from the number of clocks A being 7.

The output of the selector 26 is latched at the latch circuit 27, and is outputted from the latch circuit 27 as an output of the compare-select circuit 21 with a delay of one clock and is fed back to the adder 23. The adder 23 adds the output value (dividing counter value) of the compare-select circuit 21 thus fed back to the total number of clocks B.

More specifically, as illustrated in (g) of FIG. 4, at a timing at which the edge detecting signal rises, the dividing counter value is the output value C (=3) of the adder 23 at one clock before, and the output value C of the adder 23 is a value (=6) that adds the total number of clocks B (=3) to the dividing counter value.

Moreover, after one clock worth of the reference clock has elapsed after a timing at which the edge detecting signal rises, the dividing counter value is the output value C (=6) of the adder 23 at one clock before, and the output value C of the adder 23 is a value (=9) that adds the total number of clocks B (=3) to this dividing counter value.

Furthermore, at a time when two clocks worth of the reference clock has elapsed after the edge detecting signal rises, the output value C (=9) of the adder 23 at one clock before exceeds the number of clocks A (=7). Hence, the dividing counter value is the output value of the subtracter 25 (=2), and the output value C of the adder 23 is a value (=5) that adds the total number of clocks B (=3) to this dividing counter value.

As such, each time the output value C of the adder 23 exceeds the number of clocks A, the compare-select circuit 21 outputs a signal of a high level as a comparison result, as illustrated in (h) of FIG. 4. The latch circuit 22 latches this comparison result, and outputs the latched output as a PWM clock with a delay of one clock, as illustrated in (i) of FIG. 4.

As a result, the dividing counter value and the output value C recur in a same period as a frame period. Particularly, the dividing counter value is reset to 0 in conjunction with the frame period, and the output value C shows a value not less than the value of the number of clocks A in one frame period the same number of times as the total number of clocks B. Namely, in the example of (f) of FIG. 4, the output value C shows a value not less than the number of clocks A at a third clock from a clock previous to a clock at which the edge detecting signal rises, at a further second clock from that third clock, and at a further second clock from that clock. This state is repeated per number of clocks A (=7).

The PWM clock is generated along with the change in the output value C. Hence, the reference clock that has the number of clocks A in one frame period is converted to the dividing clock that includes the total number of clocks B in one frame period, namely, the dividing clock that is divided by A/B.

(Operation Example 2 of Divider)

Figure 5:
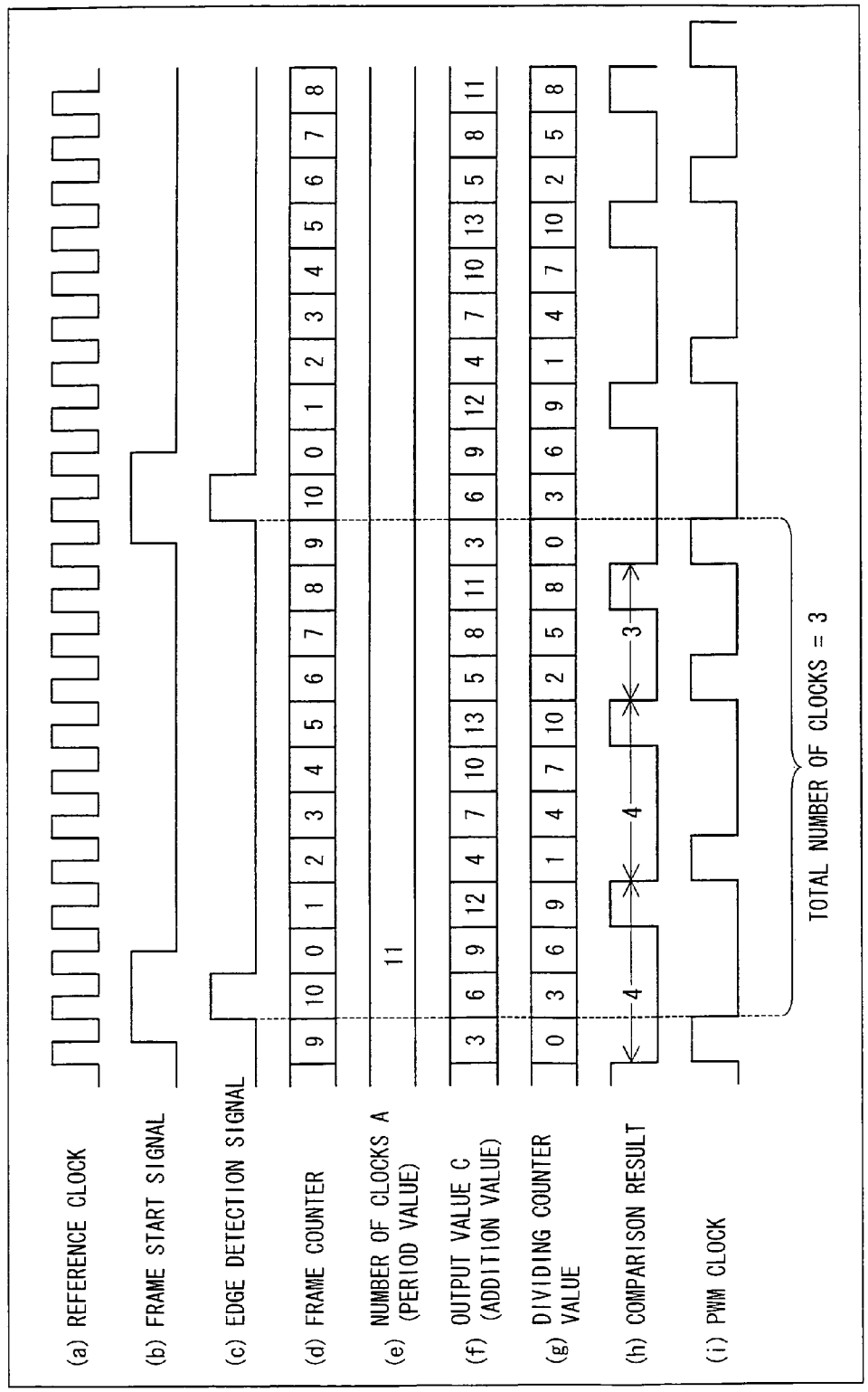
FIG. 5 is a timing chart illustrating examples of other timings of various signals related to generation of a PWM clock in the clock generation circuit illustrated in FIG. 3.

Next described with reference to FIG. 5 is a case where the frame period changes to be longer as compared to the example of FIG. 4.

As illustrated in (b), (c), and (e) of FIG. 5, the number of clocks A in which one frame period is detected is 11. In this case also, the compare-select circuit 21 outputs a high level signal as a comparison result each time the output value C of the adder 23 exceeds the number of clocks A as illustrated in (h) of FIG. 5, by the same operation as the aforementioned operation of the divider 20. The latch circuit 22 latches this comparison result, and outputs this latched output as a PWM clock with a delay of one clock, as illustrated in (i) of FIG. 5.

The output value C and dividing counter value illustrated in (f) and (g) of FIG. 5, respectively, recur in a same period as the frame period, similarly to (f) and (g) of FIG. 4. Particularly, the dividing counter value is reset to 0 in conjunction with the frame period, and the output value C shows a value not less than the number of clocks A in one frame period the same number of times as that in the total number of clocks B. Namely, in the example of (f) of FIG. 5, the output value C shows a value not less than the number of clocks A at a fourth clock from a clock previous to a clock at which the edge detecting signal rises, at a further fourth clock from that fourth clock, and at a further third clock from that clock. This state is repeated per number of clocks A (=11).

A PWM clock is generated in line with a change in the output value C. Hence, a reference clock that has the number of clocks A in one frame period is converted to a dividing clock that has the total number of clocks B in one frame period, i.e., the dividing clock divided by A/B.

As understood from the operation examples 1 and 2, according to the clock generation circuit 6 of the present invention, it is possible to convert a reference clock to a PWM clock divided by A/B, regardless of a frame period length, by use of (a) the number of clocks A of a reference clock obtained by detecting a frame period and (b) a fixed total number of clocks B set per frame.

As a result, even if the frame period changes and becomes long or in the opposite becomes short, the total number of clocks B in one frame period of a PWM clock synchronized to the changed frame period maintains its fixed value. Therefore, as described with reference to FIG. 2, even in a case where (a) a source of the video signal is changed, (b) a destination of the display device is changed, or (c) an unknown video signal is inputted to the display device, a ratio of a lamp on time to a lamp off time of the light source driving signal that is controlled by the number of clocks in the PWM clock is maintained as a fixed ratio. As a result, it is possible to keep lighting brightness of the light source 30 in a uniform brightness.

(Operation Example 3 of Divider)

Figure 6:
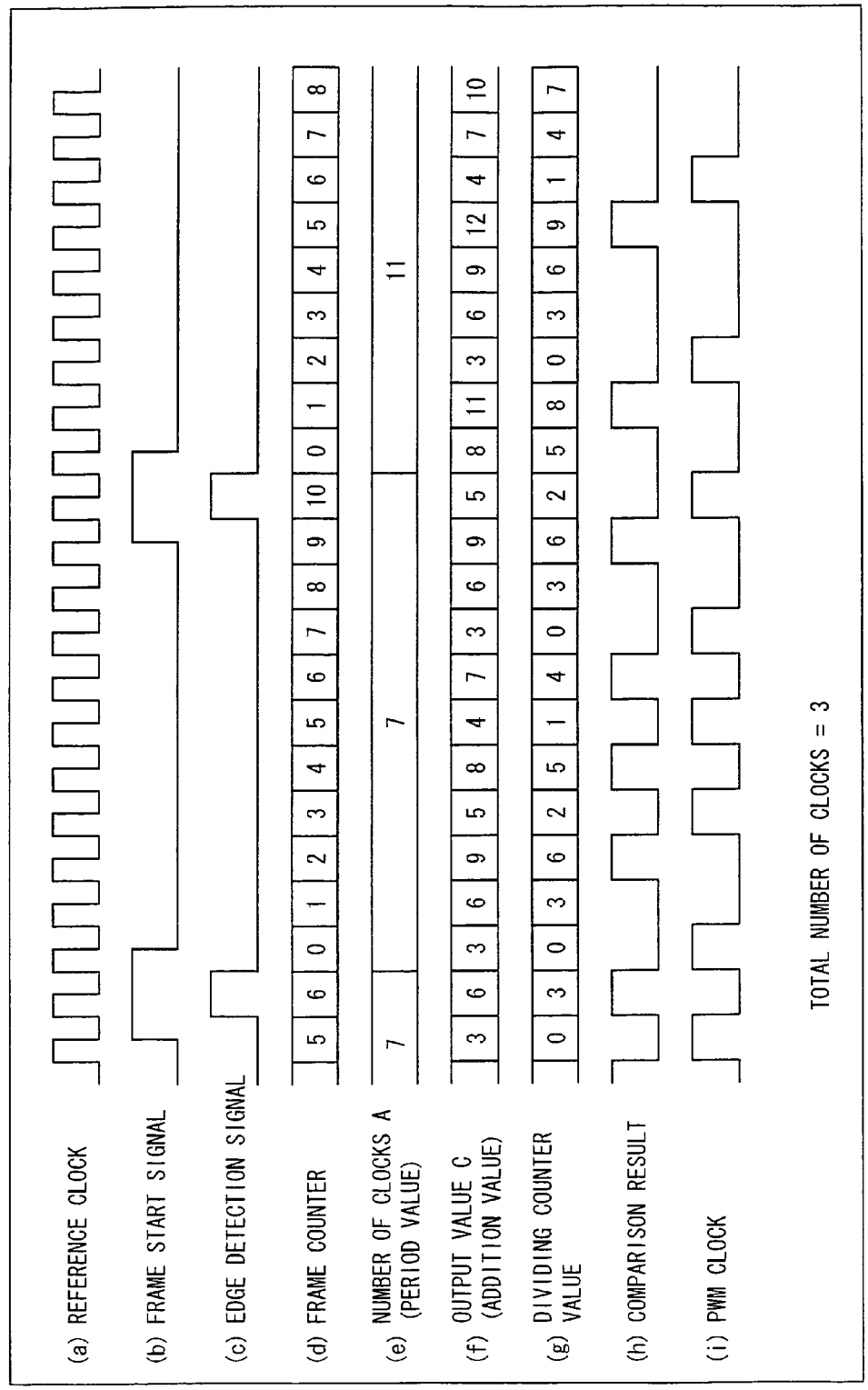
FIG. 6 is a timing chart illustrating examples of further timings of various signals related to generation of a PWM clock in the clock generation circuit illustrated in FIG. 3.

The following description deals with an operation of the divider 20 immediately after a frame period changes, with reference to FIG. 6.

As a conclusion, in a frame period immediately after a frame period change, the number of clocks per one frame period of the PWM clock varies, and does not become the total number of clocks B. However, in the second and subsequent frame periods, the number of clocks in one frame period of the PWM clock maintains the total number of clocks B, as described with reference to FIGS. 4 and 5.

This variance in PWM clock is described below. The major cause of this change is that it is only possible to use, as a period value (number of clocks A) obtained by detecting the frame period, the period value obtained before the frame period has changed, as illustrated in (e) of FIG. 6.

(b) to (d) of FIG. 6 indicates that the number of clocks A of the frame period has changed from 7 to 11. However, the detector 10 cannot detect a frame period immediately after a change in the frame period, at a time when the frame period starts to change. Hence, there is no choice but to supply to the divider 20 the number of clocks A that is obtained immediately before the frame period starts to change. Therefore, in the frame period at a time when the number of clocks A of the frame period changes from 7 to 11, the number of clocks A is still 7, as illustrated in (e) of FIG. 6.

As a result, a timing that the output value C becomes a value not less than the number of clocks A (=7) is quicker than the true timing that the output value C becomes not less than the number of clocks A (=11). Hence, the number of clocks per one frame period of the generated PWM clock is, as illustrated in (i) of FIG. 6, more than the total number of clocks B (=3), and is, for example, 4.

However, in the second and subsequent frame periods after the frame period has changed, the true number of clocks A (=11) is correctly inputted from the detector 10 to the divider 20, as illustrated in (e) of FIG. 6. Hence, it is possible to accurately control the light source 30 within one frame period, after the frame period has changed. This high-speed operation effect is attained since the clock generation circuit of the present invention is a digital circuit.

Embodiment 2

Another embodiment of the present invention is described below, with reference to FIG. 8. For easy explanation, members having identical functions to the members illustrated in drawings of Embodiment 1 are given same reference signs, and their descriptions have been omitted in the present embodiment.

Figure 8:
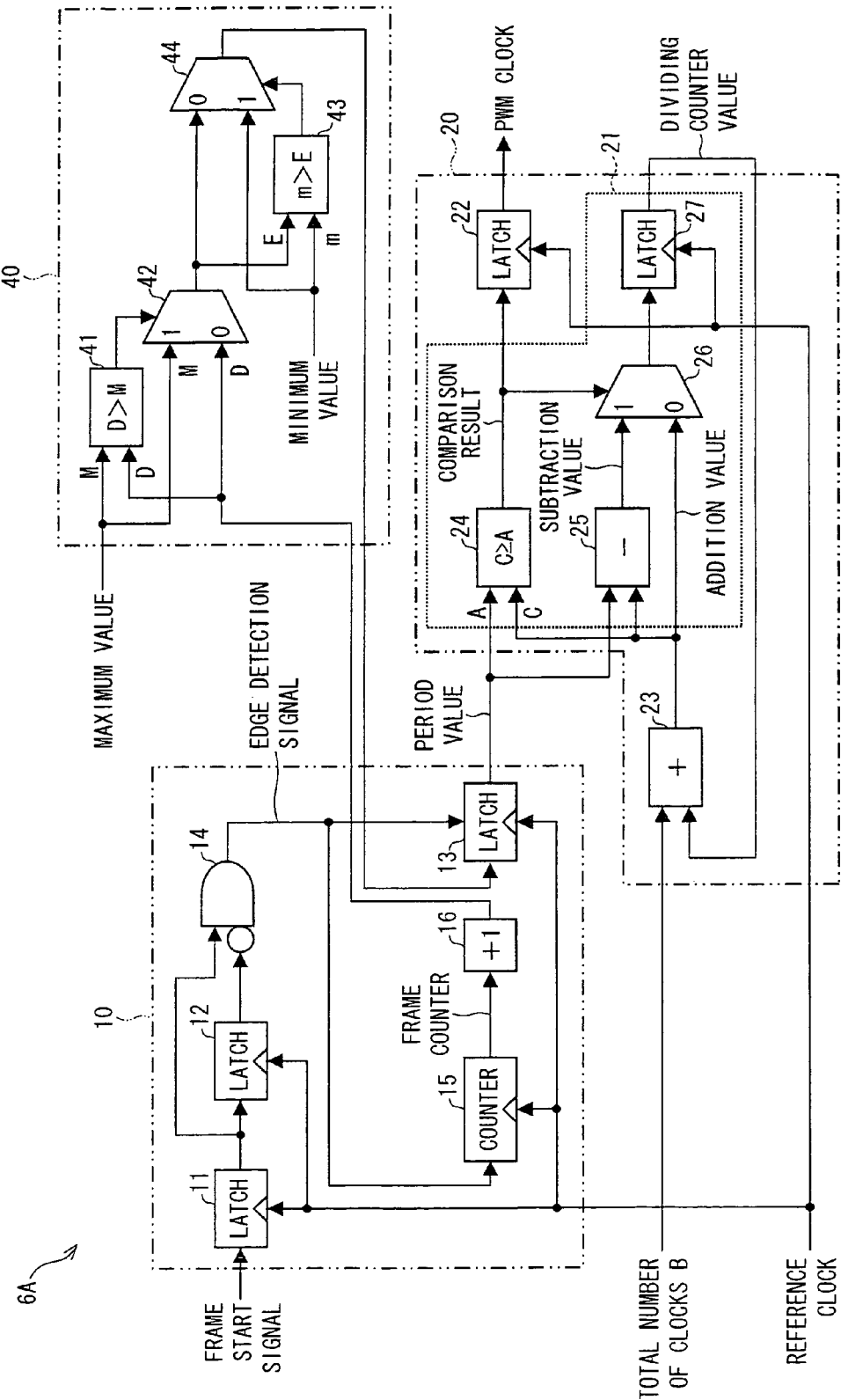
FIG. 8 is a block diagram illustrating another example of a configuration of a clock generation circuit of the present invention.
Figure 9:
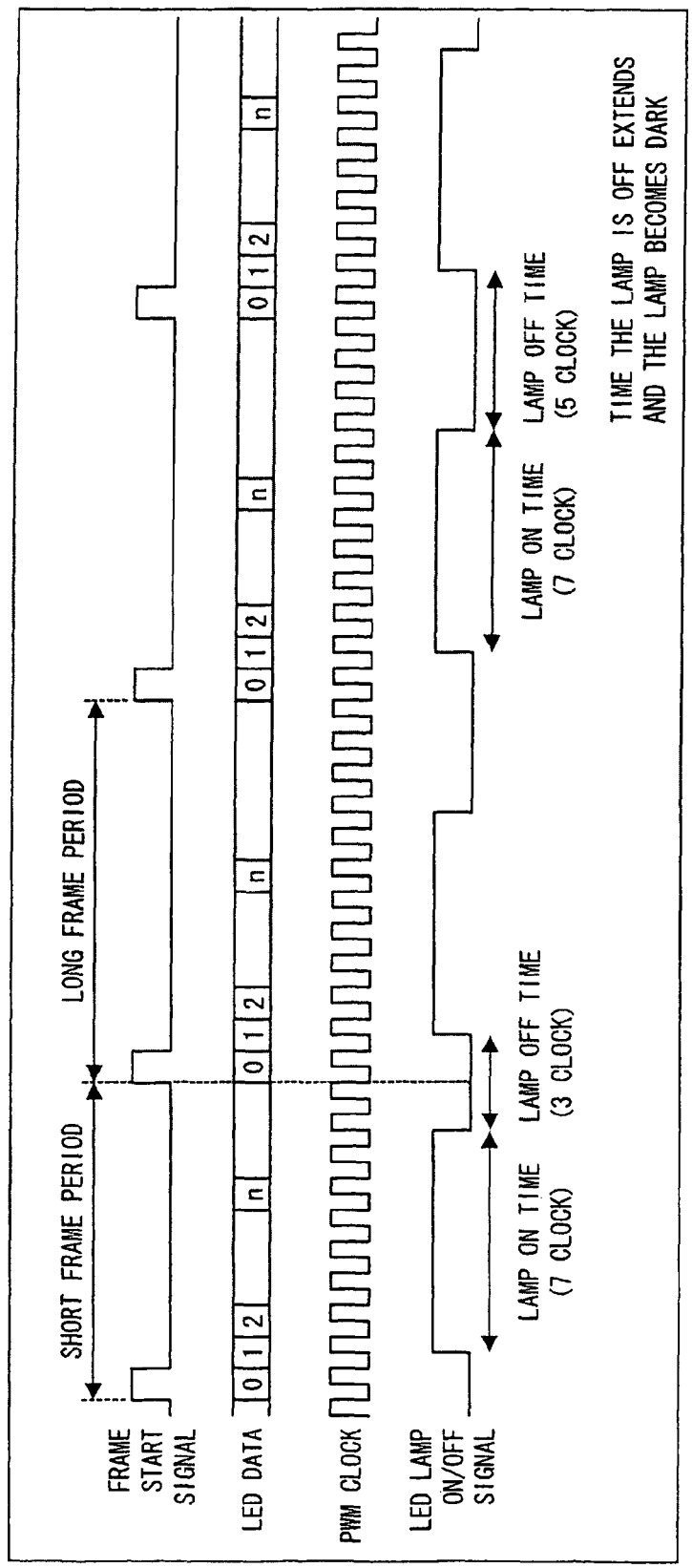
FIG. 9 is a timing chart showing a timing of various signals used in a lamp on/off operation control method that has the problem to be solved by the present invention.

FIG. 8 illustrates another configuration of a clock generation circuit of the present invention. The clock generation circuit 6A illustrated in FIG. 8 differs from the clock generation circuit 6 illustrated in FIG. 3 in that a maximum value and a minimum value of the number of clocks A (period value) is set to the clock generation circuit 6, and a period limiting circuit 40 is added to provide a limit to a value of the number of clocks A.

By providing a limit to a range in which the number of clocks A can be, it is possible to prevent, in advance, the occurrence of the period of the PWM clock becoming long or short beyond expectations.

For example, in a case where the frame start signal temporarily stops for some kind of reason, a value of the counter 15 becomes extremely large, which may cause the number of clocks A that is large beyond expectations to be outputted to the divider 20. In this case, the period of the PWM clock is extended abnormally. This may cause the light sources 30 to be turned on for a long time or a period of the on-off control of the light source 30 to extend. As a result, blinking of the light source 30 may be visually observed, thereby causing a visually undesirable state.

Moreover, when a frame start signal is repetitively outputted in a short period upon switching the video signal, the number of clocks A that is small in number beyond expectation is outputted to the divider 20. In this case, the period of the PWM clock becomes extraordinarily short; this may cause a circuit such as a LED driver 8 (see FIG. 1) that uses the PWM clock to carry out abnormal operation.

The clock generation circuit of the present embodiment prevents occurrence of such a deficiency, thereby enhancing reliability.

(Configuration and Operation of Period Limiting Circuit)

The following description deals with a configuration and operation of the period limiting circuit 40. The period limiting circuit 40 includes comparators 41 and 43, and selectors (multiplexers) 42 and 44.

The comparator 41 receives a predetermined maximum value M and an output value D of the increment circuit 16, to judge whether the output value D exceeds the maximum value M (D>M). If D does not exceed M, the comparator 41 outputs 0 as a judged result to the selector 42, and if D exceeds M, the comparator 41 outputs 1 as the judged result to the selector 42.

The selector 42 receives the maximum value M and the output value D, and outputs one of the maximum value M and output value D depending on the judged result of the comparator 41. Namely, when the selector 42 receives the result 0 judged by the comparator 41, the selector 42 outputs the output value D to the comparator 43 and the selector 44; whereas, when the selector 42 receives the result 1 judged by the comparator 41, the selector 42 outputs the maximum value M to the comparator 43 and the selector 44.

Subsequently, the comparator 43 receives the predetermined minimum value m and an output value E (either M or D) from the selector 42, to judge whether the output value E is smaller than the minimum value m (m>E). If E is not smaller than m, the comparator 43 outputs 0 as its judged result to the selector 44, and if E is smaller than m, the comparator 43 outputs 1 as its judged result to the selector 44.

The selector 44 receives the minimum value m and the output value E, and outputs one of the minimum value m and the output value E depending on the judged result of the comparator 43. Namely, when the selector 44 receives the result 0 judged by the comparator 43, the selector 44 outputs the output value E to a latch circuit 13 of the detector 10, whereas if the selector 44 receives the result 1 judged by the comparator 43, the selector 44 outputs the minimum value m to the latch circuit 13.

As described above, when the selector 42 outputs the maximum value M at a time when D exceeds M, it is always the case that m<E=M. Hence, the selector 44 outputs the maximum value M to the latch circuit 13. Further, when D is smaller than m, which D=output value E that is received by the comparator 43 when D is equal to or less than M, the selector 44 outputs the minimum value m to the latch circuit 13. As such, the maximum value and minimum value of the number of clocks of the frame period is limited.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention is applicable to a clock generation circuit that generates a first clock synchronized to a periodical signal such as a video signal, based on a second clock that serves as reference, and further is applicable to a light source control circuit that controls on and off of a light source by synchronizing with the periodical signal, and a display device that includes such a light source control circuit.

REFERENCE SIGNS LIST 1 display device
2 light source control circuit
4 liquid crystal panel (display panel)
6 PLL (clock generation circuit)
7 backlight data calculation circuit (light source control data generation circuit)
8 LED driver (light source drive circuit)
10 detector
20 divider
21 compare-select circuit
22 latch circuit (second latch circuit)
23 adder
24 comparator
25 subtracter
26 selector (multiplexer)
27 latch circuit (first latch circuit)
30 light source
40 period limiting circuit

The invention claimed is:

1. A clock generation circuit generating a first clock based on a second clock serving as reference, the first clock being synchronized with a periodical signal made up of a periodic pulse train,
the clock generation circuit comprising:
a detector detecting a period of the periodical signal as a number of clocks A of the second clock; and
a divider (i) receiving (a) the number of clocks A outputted from the detector and (b) a total number of clocks B of the first clock which is set as a fixed value corresponding to one period worth of the period of the periodical signal and (ii) outputting, as the first clock, a dividing clock obtained by dividing the second clock by A/B wherein,
the divider includes
a compare-select circuit;
an output circuit; and
an adder adding an output value of the compare-select circuit to the total number of clocks B,
the compare-select circuit comparing the number of clocks A with an output value C of the adder, and when the output value C is less than the number of clocks A, the compare-select circuit outputting the output value C, and when the output value C is equal to or more than the number of clocks A, the compare-select circuit outputting a value in which the number of clocks A is subtracted from the output value C, and
the output circuit outputting a pulse each time the output value C is of a value equal to or more than the number of clocks A.

2. The clock generation circuit according to claim 1, wherein:
the compare-select circuit further comprises:
a comparator comparing the number of clocks A with the output value C of the adder;
a subtracter subtracting the number of clocks A from the output value C of the adder; and
a selector by which an output of the comparator, an output of the adder, and an output of the subtracter are received, and when the output of the comparator shows that the output value C is less than the number of clocks A, the selector selecting the output value C of the adder, whereas when the output of the comparator shows that the output value C is not less than the number of clocks A, the selector selecting and outputting the output of the subtracter.

3. The clock generation circuit according to claim 2, wherein:
the compare-select circuit further comprises:
a first latch circuit latching the output of the selector by use of the second clock and outputting this latched output of the selector to the adder.

4. The clock generation circuit according to claim 2, wherein:
the output circuit is a second latch circuit latching the output of the comparator by use of the second clock.

5. The clock generation circuit according to claim 1, wherein the clock generation circuit is a digital circuit.

6. The clock generation circuit according to claim 1, wherein:
the detector further comprises:
a period limiting circuit providing a preset maximum value and minimum value of the period.

7. A light source control circuit comprising:
a clock generation circuit as set forth in claim 1,
a light source control data generation circuit receiving the video signal and supplying to the clock generation circuit a sync signal being indicative of the period, and further generating a lamp on/off control signal that determines a time for which the light source is turned on; and
a light source drive circuit, while controlling on and off of the light source so that the on and off of the light source synchronizes with the sync signal, (i) counting the time for which the light source is turned on, by use of the dividing clock inputted from the clock generation circuit, the time being indicated by the lamp on/off control signal inputted from the light source control data generation circuit, and (ii) generating a light source driving signal.

8. A display device comprising:
a light source control circuit as set forth in claim 7;
a light source being controlled in its lamp on/off state by the light source control circuit; and
a display panel displaying a video image while modulating an amount of light emitted from the light source based on the video signal.

9. A clock generation circuit generating a first clock based on a second clock that serves as reference, the first clock being used for controlling, in a pulse width modulation method, a lamp on time and a lamp off time of a light source illuminating a display screen by synchronizing with a video signal that is rewritten per set period,
the clock generation circuit comprising:
a detector detecting a period of the video signal as a number of clocks A of the second clock; and
a divider (i) receiving (a) the number of clocks A outputted from the detector and (b) a total number of clocks B of the first clock determining a total time of the lamp on time and the lamp off time corresponding to one period worth of the set period and (ii) outputting, as the first clock, a dividing clock obtained by dividing the second clock by A/B wherein,
the divider further includes
a compare-select circuit;
an output circuit; and
an adder adding an output value of the compare-select circuit to the total number of clocks B,
the compare-select circuit comparing the number of clocks A with an output value C of the adder, and when the output value C is less than the number of clocks A, the compare-select circuit outputting the output value C, and when the output value C is equal to or more than the number of clocks A, the compare-select circuit outputting a value in which the number of clocks A is subtracted from the output value C, and the output circuit outputting a pulse each time the output value C is of a value equal to or more than the number of clocks A.

10. The clock generation circuit according to claim 9, wherein:

the compare-select circuit further comprises:

a comparator comparing the number of clocks A with the output value C of the adder;

a subtracter subtracting the number of clocks A from the output value C of the adder; and a selector by which an output of the comparator, an output of the adder, and an output of the subtracter are received, and when the output of the comparator shows that the output value C is less than the number of clocks A, the selector selecting the output value C of the adder, whereas when the output of the comparator shows that the output value C is not less than the number of clocks A, the selector selecting and outputting the output of the subtracter.

11. The clock generation circuit according to claim 10, wherein:

the compare-select circuit further comprises:

a first latch circuit latching the output of the selector by use of the second clock and outputting this latched output of the selector to the adder.

12. The clock generation circuit according to claim 10, wherein:

the output circuit is a second latch circuit latching the output of the comparator by use of the second clock.

13. The clock generation circuit according to claim 9, wherein the clock generation circuit is a digital circuit.

14. The clock generation circuit according to claim 9, wherein:

the detector further comprises:

a period limiting circuit providing a preset maximum value and minimum value of the period.

15. A light source control circuit comprising:

a clock generation circuit as set forth in claim 9, a light source control data generation circuit receiving the video signal and supplying to the clock generation circuit a sync signal being indicative of the period, and further generating a lamp on/off control signal that determines a time for which the light source is turned on; and a light source drive circuit, while controlling on and off of the light source so that the on and off of the light source synchronizes with the sync signal, (i) counting the time for which the light source is turned on, by use of the dividing clock inputted from the clock generation circuit, the time being indicated by the lamp on/off control signal inputted from the light source control data generation circuit, and (ii) generating a light source driving signal.

16. A display device comprising:

a light source control circuit as set forth in claim 15;

a light source being controlled in its lamp on/off state by the light source control circuit; and a display panel displaying a video image while modulating an amount of light emitted from the light source based on the video signal.

* * * * *